United States Patent [19]
Chamoy

[11] Patent Number: 5,979,526
[45] Date of Patent: Nov. 9, 1999

[54] HUB AND HUB-HOLDER ASSEMBLY FOR VEHICLES EQUIPPED WITH A CENTRAL TIRE INFLATION SYSTEM

[75] Inventor: Francois Chamoy, Chamalieres, France

[73] Assignee: Compagnie Generale des Etablissements Michelin - Michelin & Cie, Clermont-Ferrand Cedex, France

[21] Appl. No.: 08/881,633

[22] Filed: Jun. 24, 1997

[30] Foreign Application Priority Data

Jun. 25, 1996 [FR] France ................................. 96 08043

[51] Int. Cl.⁶ .................................................. B60C 23/00
[52] U.S. Cl. ............................................................ 152/417
[58] Field of Search .................................. 152/415, 416, 152/417

[56] References Cited

U.S. PATENT DOCUMENTS

| | | | |
|---|---|---|---|
| 4,705,090 | 11/1987 | Bartos | 152/417 |
| 4,730,656 | 3/1988 | Goodell et al. | 152/417 |
| 4,804,027 | 2/1989 | Runels | 152/417 |
| 5,484,213 | 1/1996 | Caillaut et al. | 384/486 |

FOREIGN PATENT DOCUMENTS

| | | |
|---|---|---|
| 492900 | 1/1950 | Belgium . |
| 611082 | 3/1935 | Germany . |

*Primary Examiner*—Francis J. Lorin
*Attorney, Agent, or Firm*—Baker & Botts, L.L.P.

[57] ABSTRACT

A hub and hub-holder assembly for vehicles equipped with a central tire inflation system having a rotating joint such that tightness is assured by wear-resistant rigid parts during the inflation of the tires.

10 Claims, 5 Drawing Sheets

HUB AND HUB-HOLDER ASSEMBLY FOR VEHICLES EQUIPPED WITH A CENTRAL TIRE INFLATION SYSTEM

BACKGROUND OF INVENTION

The present invention relates to an assembly of a hub and hub-holder for vehicles equipped with a central tire inflation system and, more particularly, sealing means or rotating joints between the hubs and hub holders of these vehicles.

In order to be able to use tire inflation installation arranged on board a vehicle during the travel of the vehicle, it is necessary to provide each wheel with an air-tight rotating joint in order to assure a connection between an air compressor on the vehicle and each of the tires through the hub of each wheel.

Such rotating joints are described, for instance, in U.S. Pat. No. 4,730,656. In that patent, a flexible sealing lip 72 is clamped permanently against its cylindrical sealing surface 68 by a "circular spring 78 which exerts a radial force towards the inside". Accordingly, in this known system, the flexible parts which assure the tightness are always in rotating contact. This arrangement has several drawbacks: a certain amount of power is absorbed uselessly, which causes a harmful liberation of heat; furthermore, the parts in rotating contact wear out rapidly, which impairs their reliability and makes their replacement necessary. U.S. Pat. No. 4,804,027 proposes a device for solving this problem. In this second patent, a toroidal lobe 50 of rubber which is fastened to the stationary hub rests against a cylindrical sealing surface 22 of the movable hub; when the air pressure is high (during inflation), the lobe rests firmly against said sealing surface so as to assure tightness; upon return to atmospheric pressure "the lobes 50 rest against the surfaces 22 with a very slight pressure, or even without any contact pressure at all". This arrangement makes it possible significantly to reduce the contact pressures between the sealing lips and the corresponding sealing surfaces during periods of non-use of the inflation means. However, this arrangement does not permit the use of rigid materials in order to assure the tightness. In fact, the tightness is assured by the radial deformation of a resilient lobe. Accordingly, this lobe and the associated device always present problems of wear and therefore of life.

In the following, the term "hub" will be used to cover all the parts movable in rotation around the fixed hub carrier of a vehicle axle with the exception of the tires and the connecting ball bearings. Thus the term "hub" will include the hub proper, but also the wheel which is rigidly fastened to the hub.

Similarly, "hub holder" will be used to designate all the stationary parts of the axle.

SUMMARY OF THE INVENTION

The object of the present invention is to provide an assembly of a hub, hub holder and their associated sealing means, in which these sealing means are in rotating contact only during the short periods of inflation of the tires and do not present problems with regard to their life.

The invention concerns an assembly of two members, namely hub and hub holder which are connected in rotation by a bearing, for vehicles equipped with a central tire inflation system having a source of pressurized air, such that:

the hub holder, which is fixed relative to the vehicle, comprises a first air conduit having a first inlet which can be pneumatically connected to the source of pressurized air and a first outlet;

the hub, which is movable in rotation around the hub holder, comprises a second air conduit having a second inlet and a second outlet which can be connected pneumatically to the inner cavity of a tire fastened on said hub;

the first outlet and second inlet extend into a chamber between the fixed and movable members;

the said chamber is connected to the open air by at least one passageway between a first smooth annular sealing surface of one of said members and a second corresponding smooth annular sealing surface present on a rigid ring borne by an annular membrane which is integral with the other member and defining a deformable wall on said chamber so as to permit substantially axial displacement of said ring between two positions, namely:

a) a normal or open position of the air passage in which the sealing surfaces are spaced from each other, and b) a closed position in which the first and second sealing surfaces are in air-tight rotating contact with each other; and the said chamber comprises an annular leakage channel of small cross section as compared with the cross section of the first conduit, so that a connection of the first conduit to the source of pressurized air results in excess pressure in said chamber, and the resultant of the forces acting on the walls of the annular membrane urges the ring towards its closing position.

Therefore, the tightness of the air conduits through the hub holder and the hub is assured only during the inflation of the corresponding tire. This guarantees that losses of frictional energy are reduced to a minimum. Furthermore, the rings are rigid; they can thus be or comprise elements made of materials, such as carbon, especially developed to have a low coefficient of friction, dry operation, and an excellent resistance to wear and heating. The life of these parts, and therefore of the sealing means, is therefore also excellent.

The presence of the leakage channel of small cross section as compared with the cross section of the compressed air feed conduit makes it possible, in simple manner, to assure the establishing of a pressure difference between the two sides of the annular membranes which is sufficient to assure the axial displacement of the rings and of the sealing surfaces and thus to create the air-tightness of the chamber. This solution is particularly simple. This leakage channel is preferably arranged axially; it thus has the advantage of having a constant cross section whatever the respective positions of the sealing surfaces.

The annular membrane of the sealing means is preferably made of rubber.

In a variant of the invention, the sealing means comprise two annular membranes and two rings.

Finally, the corresponding sealing surfaces are advantageously oriented radially.

DESCRIPTION OF THE DRAWINGS

Embodiments of the invention will now be described in the case of a passenger car, given by way of illustration and not of limitation, with reference to the accompanying drawing, in which.

DESCRIPTION OF PREFERRED EMBODIMENTS

Figure 1:
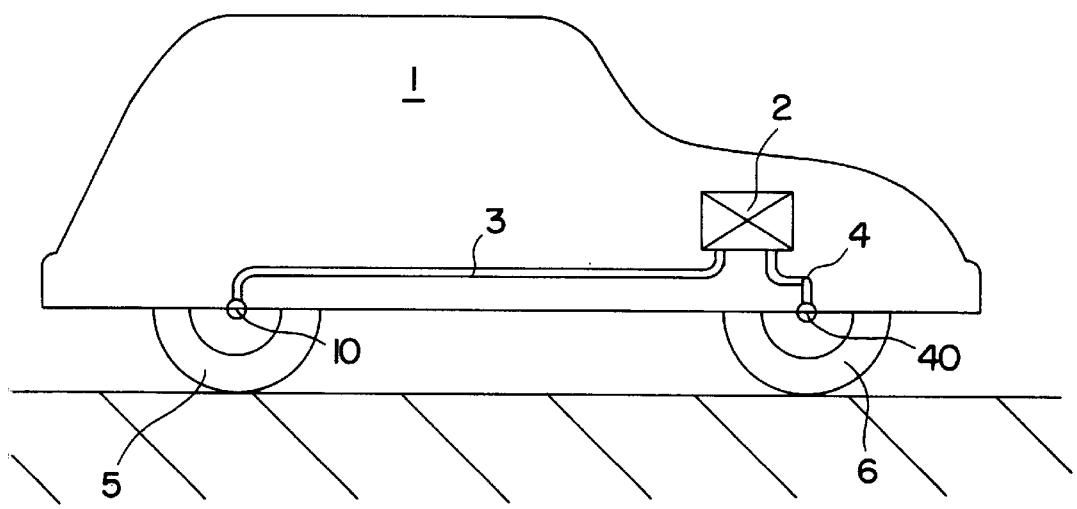
FIG. 1 is a diagrammatic view of a vehicle equipped with a central tire inflation system.

FIG. 1 shows a vehicle 1 having a central tire inflation system installed in it. This system comprises an electric air compressor 2 or an air compressor driven by the engine (not shown), and pipes, such as 3 and 4, for sending air under pressure into the tires 5 and 6 through the hub and hub-holder assemblies 10, 40, as will be explained below. Of course, the number of tires connected corresponds to the number of wheels of the vehicle equipped in accordance with the invention.

Figure 2:
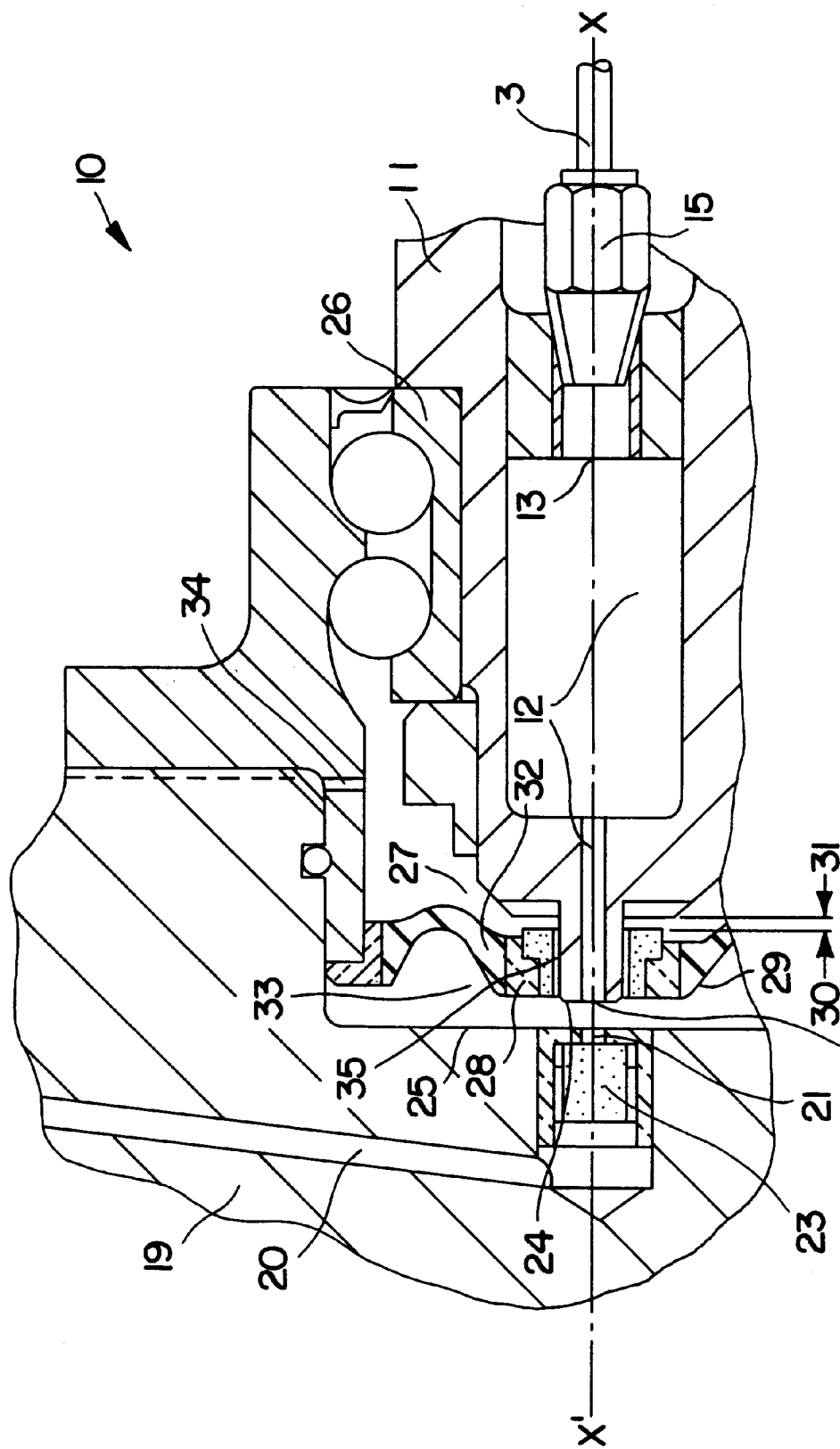
FIG. 2 is a sectional view through a first assembly consisting of non-driving hub and hub holder in accordance with the invention, the inflation system being at rest.

FIG. 2 is a cross section through a first non-driving hub and hub-holder assembly 10 in accordance with the invention corresponding to a load-bearing axle of a vehicle. The stationary hub holder 11 is pierced along its axis XX' to receive a rapid pneumatic connection 15 connected to the air pipe 3 leading to the source 2 and to provide an air conduit 12 with a first inlet 13 and a first outlet 14. The hub 19 is connected in rotation to the hub holder 11 by an ordinary ball bearing 26. The hub 19 comprises an air conduit 20 having a second inlet 21 and a second outlet (not shown) which extends into the inner cavity of the tire 5. The second inlet 21 is arranged opposite the first outlet 14 of the air conduit 12 and comprises a non-calibrated non-return valve 23 which assures the non-deflation of the tire 5 when the pipe 3 is not pneumatically connected to the source of compressed air 2.

The wall 24 of the hub holder 11 near the first outlet 14 defines, with the wall 25 of the hub 19 arranged near the second inlet 21 and the bearing 26, a cavity 27 which is not air-tight due to the presence of a channel leading to the open air 34 through which the air can escape.

In order to make the pneumatic connection between the first outlet 14 and the second inlet 24 air-tight, the following sealing means are provided. These means comprise a rigid annular ring 28 with a sealing disk 29 made preferably of carbon. The sealing disk has a first sealing surface 30 arranged radially in order to be able to rest against a second corresponding sealing surface 31 attached to the end of the hub holder 11. This second sealing surface 31 is preferably very hard and ground. This second sealing surface 31 is formed here of a ceramic ring. The ring 28 is tightly fastened to an annular membrane 32 which in its turn is fastened in air-tight manner to the wall 25 of the hub 19. The annular membrane 32 is preferably made of flexible rubber. The sealing disk 29 has an inside diameter slightly greater than the outside diameter of the axial end of the hub holder 11 so that there is no rubbing between them, while leaving an annular leakage channel 35 of small cross section relative to the minimum cross section of the conduit 12. The annular leakage channel 35 has advantageously a clearance which is between 0.2 and 0.5 mm. In any event, the cross section of this annular leakage channel 35 is at most equal to 75% of the minimum cross section of the conduit 12.

As has been stated, the corresponding sealing surfaces 30, 31 of the sealing disk 29 and the hub holder 11 are preferably of radial orientation. They may also be frustoconical. On the other hand, the main movement of displacement of the ring 28 is always an axial movement, while permitting an angular movement in order to accommodate the functional clearances of the hub.

In the cavity 27, the annular membrane 32 thus defines with the wall 24 of the hub holder 11 arranged in the vicinity of the first outlet 14 and with the wall 25 of the hub arranged in the vicinity of the second inlet 21, a pneumatic chamber 33.

In operation, when the pipe 3 is not pneumatically connected to the source of air 2, the air contained in said pipe 3, the conduit 12 and the chamber 33 is at atmospheric pressure, in view of the distance between the sealing surfaces 30 and 31 and the leakage of air through the air-venting channel 34. On the other hand, the air cannot escape from the conduit 20 of the hub 19 in view of the presence of the non-calibrated non-return valve 23. In this condition, the corresponding first and second sealing surfaces 30 and 31 of the sealing disk 29 and of the hub 11 are separated by an axial distance between ε and a few millimeters, preferably on the order of 1 mm. This provides assurance that there is no rubbing between them and therefore no wear or loss of energy.

When the pipe 3 is pneumatically connected to the source of regulated pressurized air 2, the air pressure within the pipe 3, the conduit 12, and the chamber 33 increases due to the small cross section of the leakage channel 35 between the inside diameter of the sealing disk and the outside diameter of the axial end of the hub holder 11 relative to the minimum cross section of the conduit 12. A difference in pressure is thus established between the two sides of the annular membrane 32, and the resultant of the forces which act on the membrane serves for the axial displacement of this membrane 32 as well as the ring 28 towards the hub holder 11 until the first sealing surface 30 is applied against the corresponding second sealing surface 31 of ceramic of the hub holder 11 and thus to assure excellent tightness of the chamber 33.

Figure 3:
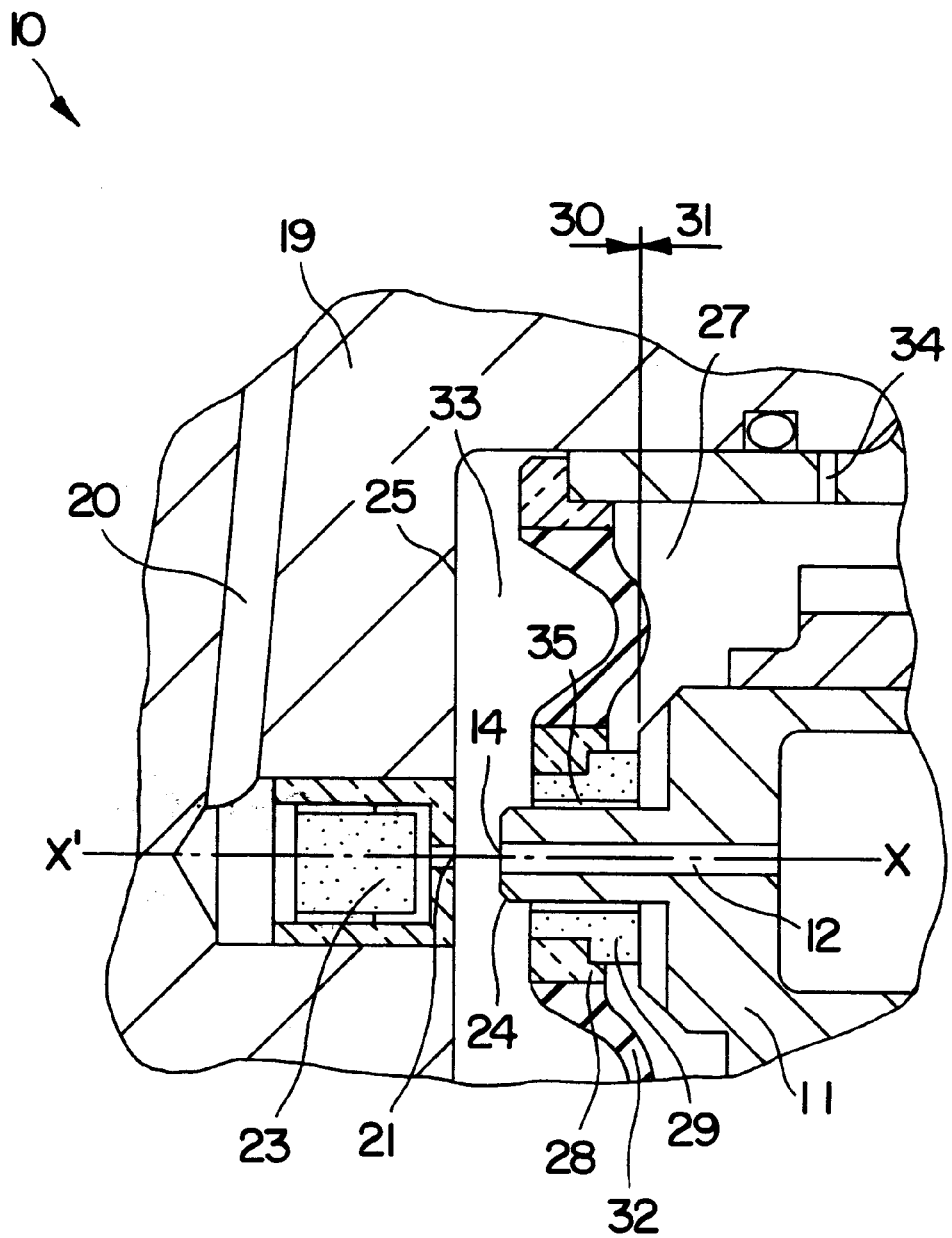
FIG. 3 is an enlargement of part of FIG. 2, the inflation system being in operation.

FIG. 3 is an enlarged cross section of FIG. 2 showing the assembly when the inflation system is operating. This figure shows the contact of the first and second sealing surfaces 30 and 31 respectively which assures the pneumatic tightness of the chamber 33, as well as the non-calibrated and non-return valve 23 in open position when the pressure in the conduit 20 is less than the pressure of the source of pressurized air.

Figure 4:
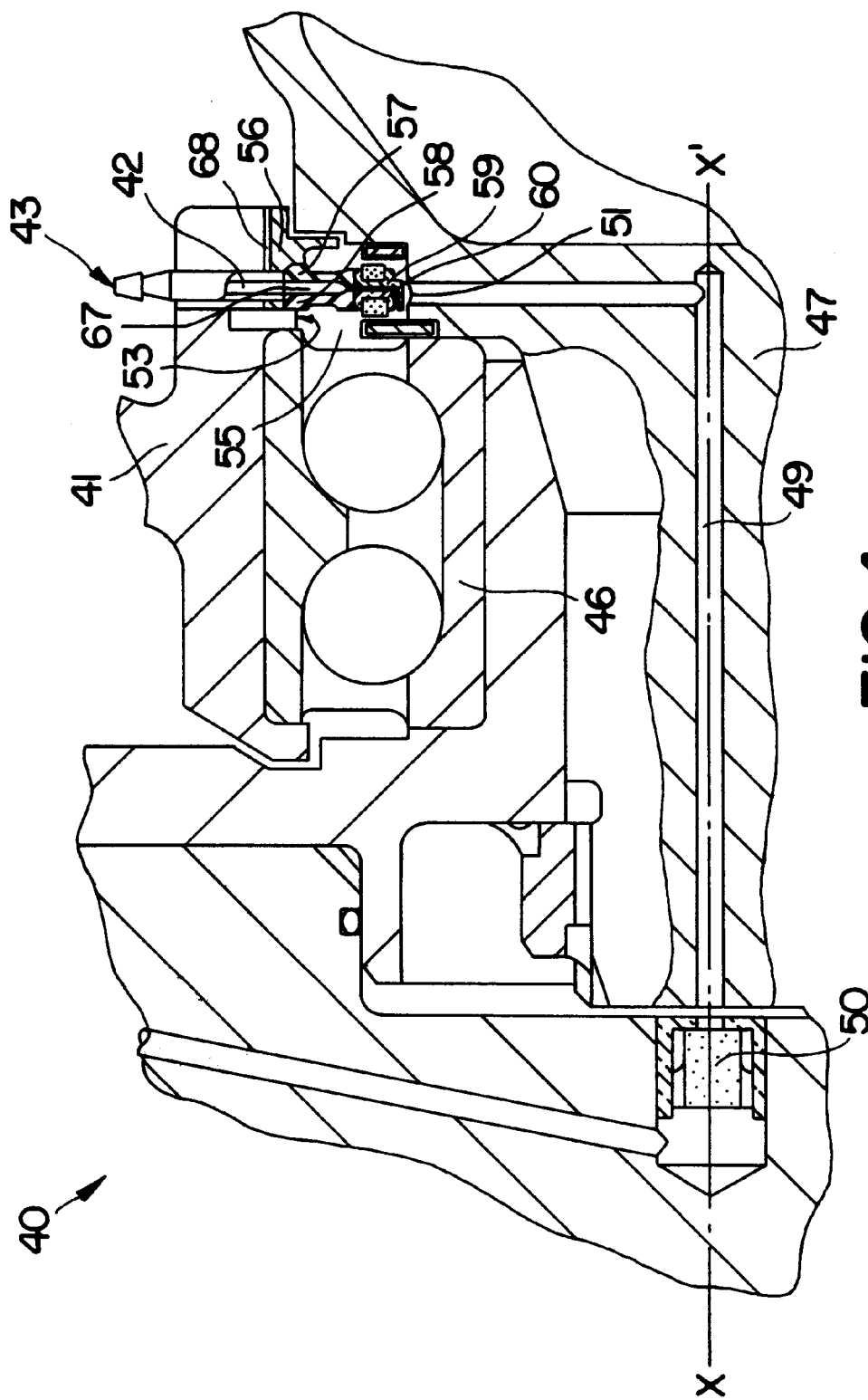
FIG. 4 is a sectional view through a second assembly consisting of driving hub and hub holder assembly in accordance with the invention, the inflation system being at rest.
Figure 5:
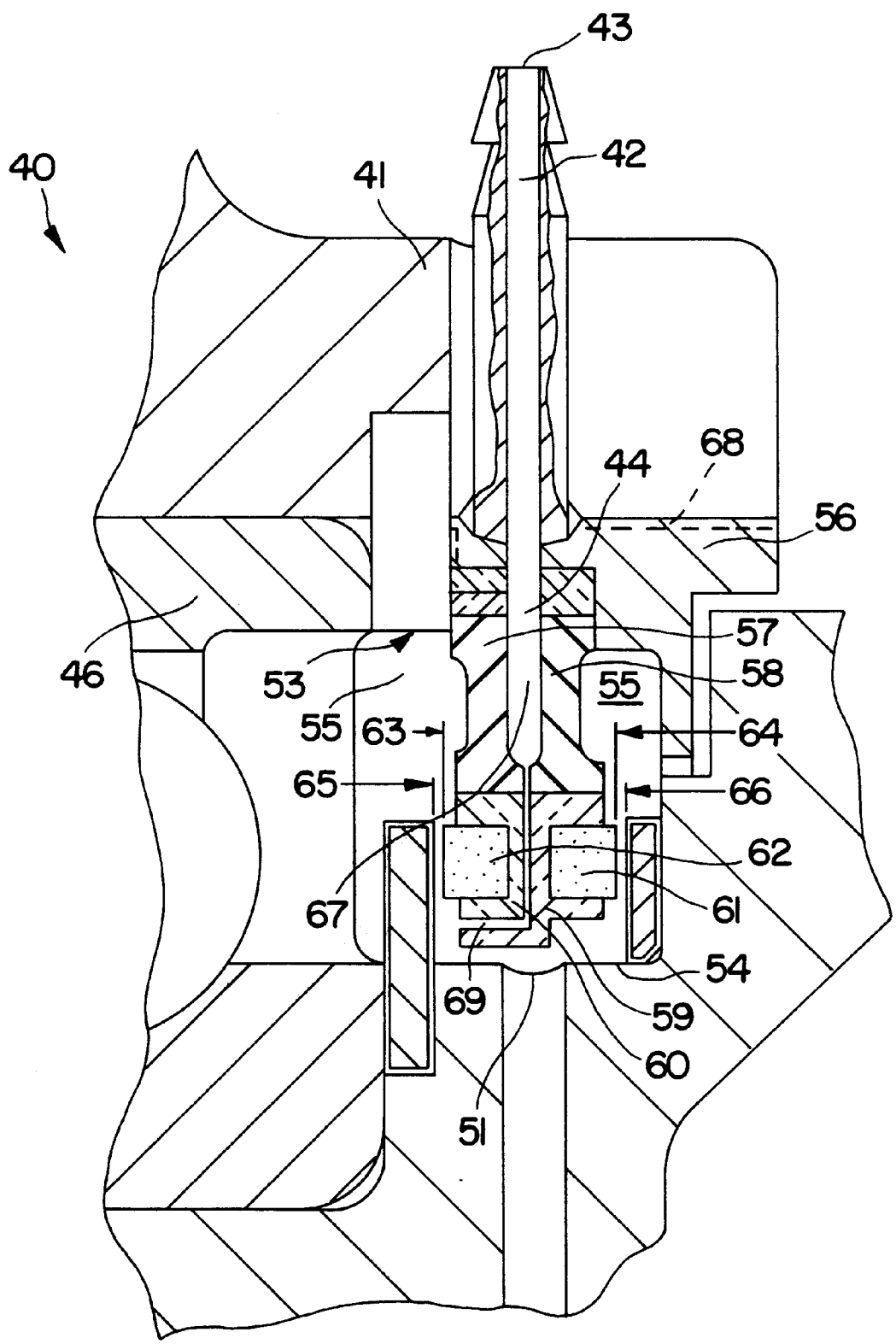
FIG. 5 is an enlarged view of FIG. 4.

FIGS. 4 and 5 show, in cross section, a second hub and hub-holder assembly 40 in accordance with the invention, corresponding, in particular, to a driving axle of a vehicle. There can be noted the stationary hub holder 41 which is traversed by an air conduit 42 having a first inlet 43 and a first outlet 44. In this embodiment, the air conduit 42 is integral with the sealing means of the assembly 40. As previously, the air conduit 42 can be pneumatically connected to the source of pressurized air 2 by the pipe 4. This assembly is connected in rotation around the axis XX' by the standard bearing 46.

The hub 47 is traversed by an air conduit 49 having a second inlet 51 arranged opposite the first outlet 44 and a second outlet (not shown) extending into the inner cavity of the tire 6. The conduit 49 has a non-calibrated non-return valve 50.

The wall 53 of the hub holder 41, in the vicinity of the first outlet 44, and the wall 54 of the means 47, in the vicinity of the second inlet 51, define a cavity 55. This annular cavity has two openings to the open air, the first through an air-venting channel 68 arranged on the side of the ball bearing 46 and the second widely open on the inner side of the vehicle. An annular centering ring 56 closes the greater part of this second opening, which also makes it possible to prevent dust or other foreign substances from entering into this cavity 55. Furthermore, the following sealing means are contained within the cavity 55.

Two of these sealing means are provided in view of the preceding two openings. They comprise (FIG. 5) two flexible annular membranes 57 and 58 and two rigid annular rings 59 and 60. The annular membranes 57 and 58 are fastened, in air-tight manner, on the one hand to the annular centering part 56 and on the other hand to the two rings 59 and 60. The annular membranes 57, 58 are made of flexible rubber and permit axial and angular displacements of the rings 59 and 60. As previously, the annular rings comprise sealing disks 61, 62 with first radial bearing surfaces 63, 64 made of carbon in order to have excellent resistance to wear and a very low coefficient of friction. These first sealing surfaces 63, 64 are arranged axially opposite the second corresponding sealing surfaces 65, 66 applied to the wall 54 of the hub 47. The second sealing surfaces 65 and 66 are resting parts of ceramic applied to the hub 47.

The two annular membranes 57, 58 define, with the wall 54, a pneumatic chamber 67 on the side of the second inlet.

The annular rings 59 and 60 fit one within the other so as to constitute an annular leakage channel 69 arranged axially between them. The clearance of this annular channel is such that the cross section of this leakage channel 69 is at most equal to 75% of the cross section of the air inlet channel 42. This channel 69 is arranged axially in such a manner that its cross section is substantially constant whatever the respective positions of the two flexible membranes 57 and 58 of the pneumatic chamber 67. This assures reliable operation of the arrangement.

When the first inlet is pneumatically connected to the source of compressed air, the pressure of the air in, in particular, the chamber 67, increases and presses the first sealing surfaces 63 and 64 of the rings 59 and 60 against the second sealing surfaces 65, 66 of the hub 47. The tightness of the chamber 67 is therefore in this way assured upon each inflation or each adjustment of pressure of the tires 6 (FIG. 5). The return to normal opening position is effected by elastic recoil of the membranes in all the configurations.

I claim:

1. An assembly of two members, hub and hub holder, for vehicles equipped with a central tire inflation system and a source of pressurized air, such that:

the hub holder, which is fixed relative to the vehicle, comprises a first air conduit with a first inlet which can be pneumatically connected to the source of pressurized air and a first outlet;

the hub, movable in rotation around the hub holder, comprises a second air conduit with a second inlet and a second outlet which can be connected pneumatically to the inner cavity of a tire mounted on said hub;

the first outlet and second inlet extend into a chamber between the fixed and movable members;

the said chamber is connected to the open air by at least one passageway between a first smooth annular sealing surface of one of said members and a second corresponding smooth annular sealing surface provided on a rigid ring borne by an annular membrane which is integral with the other member and defining a deformable wall of said chamber so as to permit substantially axial displacement of said ring between two positions, namely:

a) a normal or open position of the air passageway in which the sealing surfaces are spaced from each other; and b) a closed position, in which the first and second sealing surfaces are in air-tight rotating contact with each other; and the said chamber comprises an annular leakage channel of small cross section as compared with the cross section of the first conduit so that a connection of the first conduit to the source of pressurized air results in an excess pressure in said chamber and the resultant of the forces acting on the walls of the annular membrane urges the ring towards its closing position.

2. An assembly according to claim 1, in which the cross section of the annular leakage channel is less than or equal to 75% of the cross section of the first conduit.

3. An assembly according to claim 1, in which the annular leakage channel is arranged axially between the ring and that one of said members having the first sealing surface.

4. An assembly according to claim 1, in which the chamber is connected to the open air by two passageways between a first smooth annular sealing surface integral with one of said members and a second corresponding smooth annular sealing surface provided on two rigid rings borne by two annular membranes integral with the other member and defining two deformable walls of said chamber and in which the annular leakage channel is arranged between the two rings.

5. An assembly according to claim 4, in which the said annular leakage channel is arranged axially between the two rings.

6. An assembly for vehicles according to claim 4, in which the flexible annular membranes are rubber.

7. An assembly for vehicles according to claim 4, in which each first sealing surface is a carbon sealing disk.

8. An assembly for vehicles according to claim 1, in which the first and second sealing surfaces have a radial orientation.

9. An assembly for vehicles according to claim 1 in which the annular membrane is rubber.

10. An assembly for vehicles according to claim 1 in which the first sealing surface is a carbon sealing disk.

* * * * *